United States Patent [19]

Koike et al.

[11] Patent Number: 4,639,130

[45] Date of Patent: Jan. 27, 1987

[54] INSPECTION APPARATUS FOR OPTICAL FIBER ASSEMBLY

[75] Inventors: Kazuyoshi Koike; Yasuteru Tahara, both of Otake, Japan

[73] Assignee: Mitsubishi Rayon Co., Ltd., Tokyo, Japan

[21] Appl. No.: 749,422

[22] Filed: Jun. 27, 1985

[30] Foreign Application Priority Data

Jun. 29, 1984 [JP] Japan .................................. 59-134182

[51] Int. Cl.[4] ........................................... G01N 21/84
[52] U.S. Cl. ..................................... 356/73.1; 356/244
[58] Field of Search .............................. 356/73.1, 244; 350/96.20

[56] References Cited

FOREIGN PATENT DOCUMENTS

| 1622475 | 4/1970 | Fed. Rep. of Germany ... 350/96.20 |
| 57-44831 | 3/1982 | Japan .................................. 356/73.1 |
| 58-205118 | 11/1983 | Japan .................................. 350/96.20 |

*Primary Examiner*—Vincent P. McGraw

*Attorney, Agent, or Firm*—Oblon, Fisher, Spivak, McClelland & Maier

[57] ABSTRACT

Provided is an apparatus for inspecting an optical fiber assembly through measuring irregularities in transmission loss of optical fibers which constitute said optical fiber assembly. The apparatus includes a base, a first slider block slidably laid on the base, means attached to the first slider block and adapted to grip both ends of the optical fiber assembly, a feed mechanism for feeding the first slider block by sliding the same on the base, a frame member secured to the base, a second slider block carried by the frame member, a light projector carried by the second slider block and adapted to irradiate a light beam onto the light receiving end of one of the optical fibers, a light receiver for receiving a light beam from the light emitting end of the one of the optical fibers and a light stop disposed in the light projector and adapted to stop the light beam irradiated by the light projector so that the light beam may be irradiated, exclusively, onto the light receiving end of only one of the optical fiber and within the same.

12 Claims, 5 Drawing Figures

F I G. 4
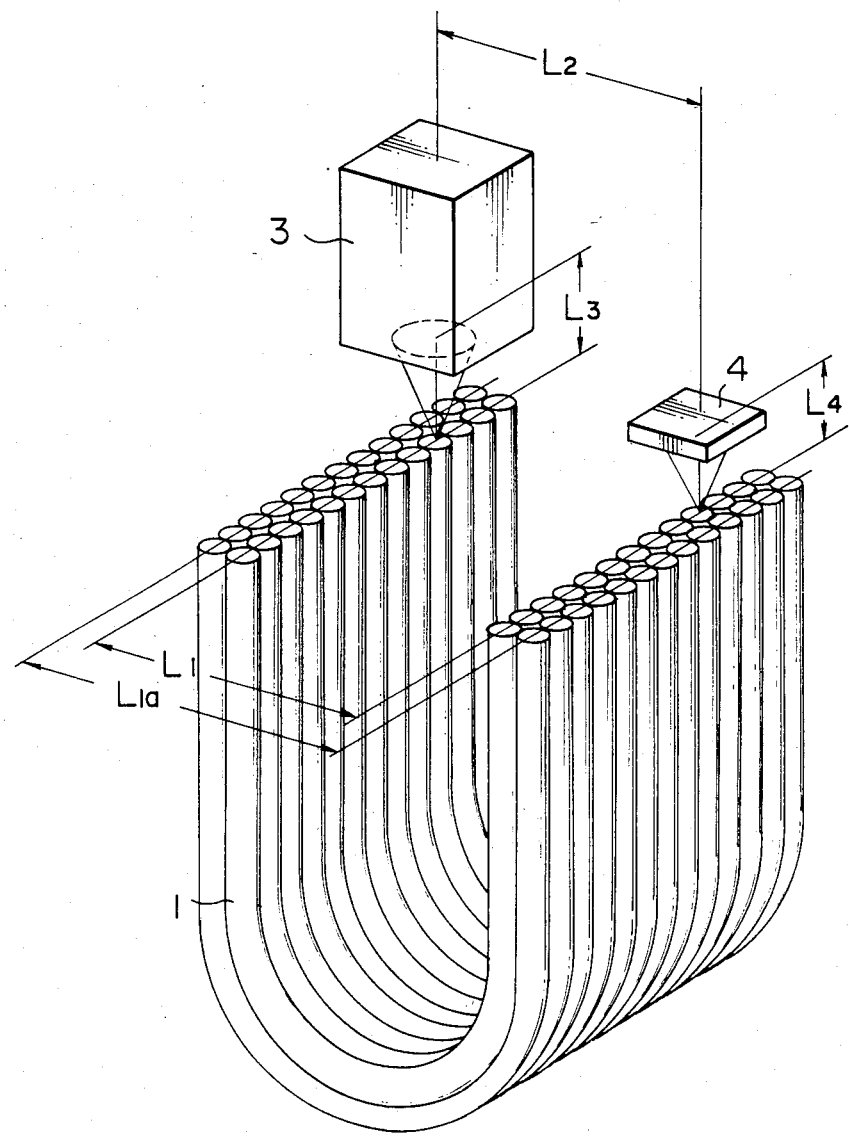

INSPECTION APPARATUS FOR OPTICAL FIBER ASSEMBLY

BACKGROUND OF THE INVENTION

1. Field of the Invention

The present invention relates to an apparatus for inspecting loss of optical transmission of optical fibers which are arrayed in one row or in plural rows and which constitute an optical fiber assembly.

2. Description of the Prior Art

Extreme difficulties have hitherto been encountered in measuring optical transmission loss of an optical fiber assembly composed of optical fibers arrayed in one row or in plural rows without collapsing the form of fiber arrangement. The reason for this is due, for example, to the fact that there are no means with efficiency and yet with high precision for irradiating a measuring light beam onto only a specific optical fiber without stray light. A method of taking apart each end of the optical fiber assembly into individual optical fibers and mesuring irregularities in optical transmission loss thereof has therefore been used. In this method, however, when the number of optical fibers constituting the optical fiber assembly is increased, a large amount of time is needed to take it apart into individual fibers. In addition, in case of a step index optical fiber assembly, there is a possibility that the interface between the core and cladding is broken down when the assembly is taken apart.

When measuring the optical transmission loss, the end face of each optical fiber is polished to a uniform surface roughness of for the purpose of making the measurement variation small. It is very difficult, however, to polish such end face uniformly for each fiber.

Thus, in the optical fiber assembly having a large number of optical fibers, much time is conventionally required for taking it apart into individual fibers, polishing, and measuring as mentioned above.

SUMMARY OF THE INVENTION

The object of the invention is to provide an inspection apparatus for optical fiber assembly which is capable of measuring with high efficiency and yet with high precision the irregularities in optical transmission loss of optical fibers constituting an optical fiber assembly in a state wherein they are arrayed in one or plural rows.

To attain the above object, according to the present invention, there is provied an apparatus for inspecting an optical fiber assembly composed of a plurality of optical fibers having light receiving and emitting ends, in such a manner as to measure irregularities in transmission loss of the optical fibers, comprising: a base, a first slider block slidably laid on the base, gripping means attached to the first slider block and adapted to grip both ends of the optical fiber assembly in a manner that they are substantially flush with each other, a feed mechanism for feeding the first slider block by sliding the same on the base, a frame member secured to the base, a second slider block carried by the frame member, a light projector carried by the second slider block and adapted to irradiate a light beam onto the light receiving end of one of the optical fibers, a light receiver carried by the second slider block and adapted to receive a light beam from the light emitting end of the one of the optical fibers, and a light stop mechanism disposed in the light projector and adapted to stop the light beam irradiated by the light projection, so that the light beam may be irradiated, exclusively, onto the light receiving end of only one of the optical fibers and within the same.

Other objects, features and advantages of the invention will become apparent from the following description when read in connection with the accompanying drawings in which:

BRIEF DESCRIPTION OF THE DRAWINGS

FIG. 4 is a perspective view illustrating another inspection apparatus in a variant form of the present invention.

DETAILED DESCRIPTION OF THE PREFERRED EMBODIMENTS

Figure 1:
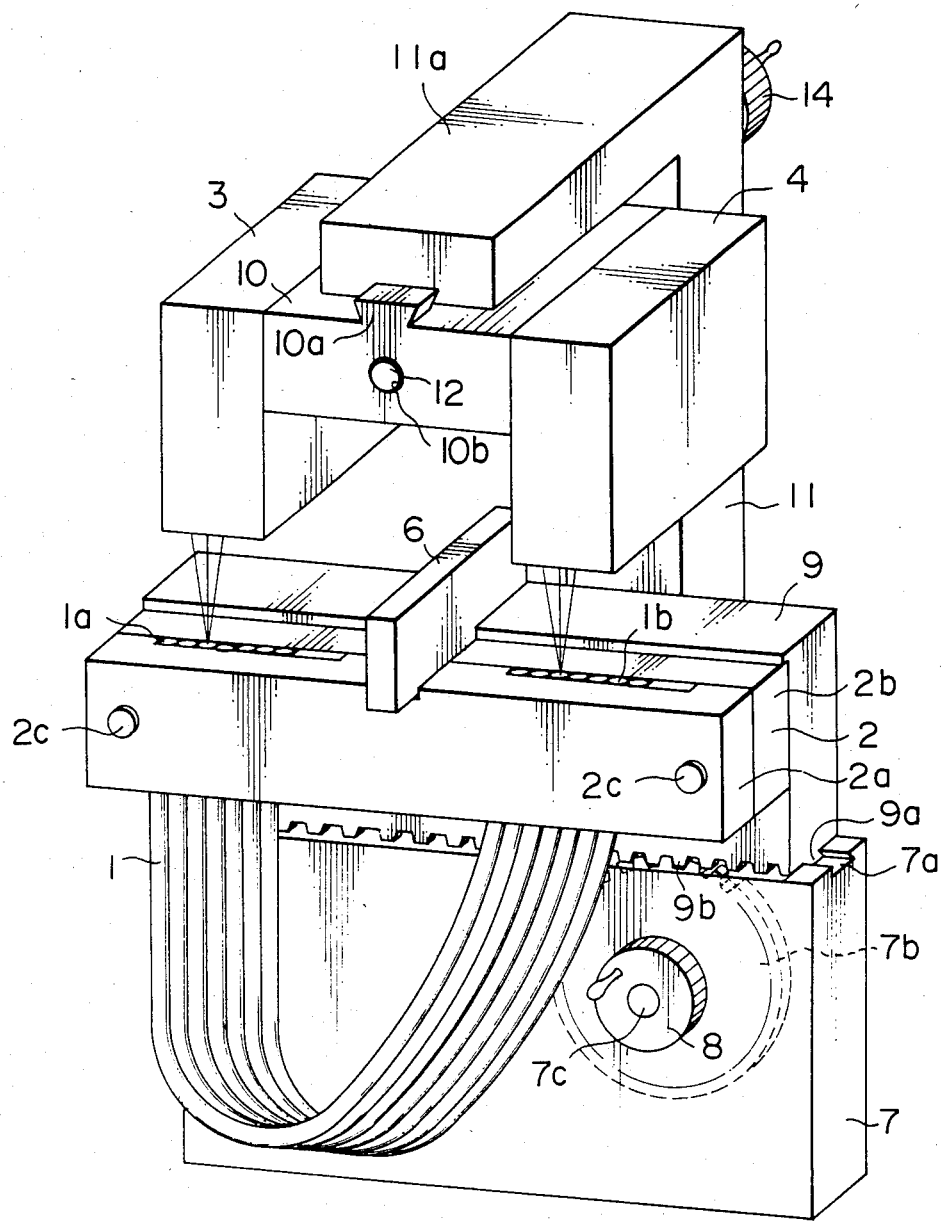
FIG. 1 is a perspective view illustrating an inspection apparatus for optical fiber assembly in one-embodiment form of the present invention.

FIG. 1 is a perspective view of an inspection apparatus for optical fiber assembly according to an embodiment of the invention. In this embodiment an optical fiber assembly 1 is mounted such that respective ends, at end side 1a, 1b, of the optical fibers are gripped between gripping plates 2a, 2b of a gripping means 2. Further, the end faces of the optical fibers at one-end side are substantially flush with the end faces thereof at the other end side.

The gripping means 2 is disposed such that the upper surfaces thereof, i.e., the upper surfaces of the gripping plates 2a, 2b constitute one exact flat plane.

The gripping means 2 is fixed to one side face of a first slider block 9 by means of two bolts 2c.

A dove-tail 9a which protrudes from the underside of the first slider block 9 is fitted into dovetail groove 7a, whereby the first slider block 9 is slidable on a base 7 in one horizontal direction. In the underside of the first slider block 9, a rack 9b is formed at one side of the dove-tail 9a. With this rack 9b is intermeshed a pinion 7b which is rotatably provided within the base 7. A rotating knob 8 is fitted onto a pinion shaft 7c from outside the base 7. When this knob is rotated, the first slider block 9 is caused to slide on the base 7.

Reference numeral 11 denotes a frame member, the lower end of which is fixed to a back side face of the base 7, and the upper end portion 11a of which is bent formed. The underside of this upper end portion 11a is formed with a dove-tail groove 11b into which there is fitted a dove-tail 10a projectively formed on the upper surface of a second slider block 10, whereby the second slider block 10 is slidable along the upper end portion 11a in a direction orthogonal to the sliding direction of the first slider block 9.

The second slider block 10 is formed with a feed screw hole 10b in such a manner that it pierces through the block. Into this feed screw hole 10b is screwed a feed screw shaft 12 rotatably supported by the frame member 11. A rotating knob 14 is fitted onto a rear end portion of the feed screw shaft 12. When the knob 14 is rotated, the slider block 10 is moved in a direction orthogonal to the sliding direction of the first slider block 7.

At both sides of the second slider block 10 there are provided a light projector 3 and a light receiver 4 as later described in such a manner that a light beam is irradiated from the light projector 3 onto the light receiving end of a single optical fiber to be measured and this light beam emitted from the light emitting end thereof is received by the light receiver 4. Within the light projector 3, there is provided a stop mechanism so that the light beam from that light projector may be irradiated, exclusively, onto the light receiving end of a single optical fiber and within the same.

Reference numeral 6 denotes a light shielding member which serves to prevent the stray light reflected from the light projector side, from directly reaching the light receiver 4, to thereby make small the errors in measurement due to the stray light.

The distance between both corresponding ends of each optical fiber desirably is equal to the distance between the light projector and light receiver. However, even when both distances are not equal due to nonuniformity of the interval between the ends of each optical fiber assembly, it would be sufficient if the difference between both is to such a permissible extent that the light emitted from the light emitting end of optical fiber can all be received by the light receiver. In this case, if the distance between the light receiving end and the light emitting end of the optical fiber assembly is greatly different from the distance between the light projector and the light receiver having a large light receiving area may be employed. Or alternately, an integrating sphere or the like can be inserted as a countermeasure.

The gripping means 2 desirably is of a structure which can be easily mounted on and demounted from the first slider block 9. It is also utilized for setting the optical fibers and polishing the same. In order to polish with high efficiency, however, it is desirable that their light receiving ends and light emitting ends are made flush with each other.

Figure 2:
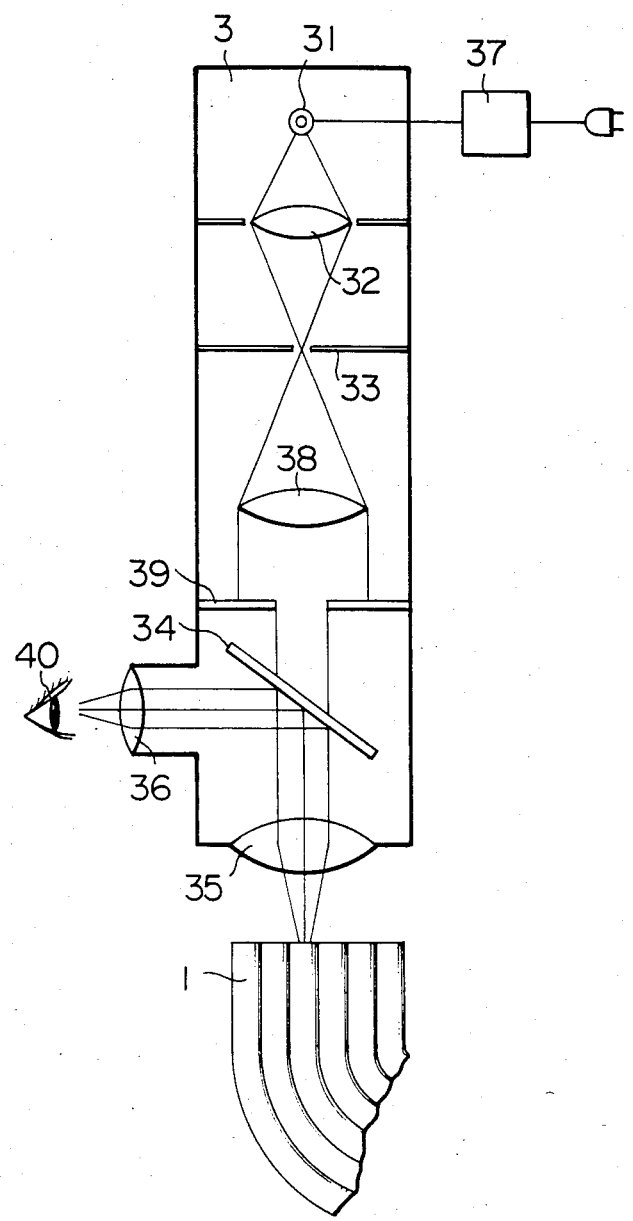
FIG. 2 is a transverse-sectioned view illustrating a light projecting device used in the inspection apparatus shown in FIG. 1.

The construction of the light projector device 3 constituting the inspection apparatus of the present invention will now be described with reference to FIG. 2. The light emitted from a lamp 31 lit by way of a constant voltage device 37 is condensed, by a condensing lens 32, onto the position of a field stop 33. Then, it is made parallel beams by means of a collimator lens 38 and is again condensed by an objective lens 35, thus to be irradiated onto a single optical fiber to be measured. By manipulating the field stop 33, the area of irradiation of light onto the optical fiber assembly is varied to prevent light from being irradiated onto other optical fibers than that which is desired to be measured, thus to enhance the precision of measurement.

Measurement can be made through inserting a stop mechanism 39 in the course of the advancing parallel light beams to thereby vary the numerical aperture. In this case, it is also possible to replace the objective lens 35 by another one which has a different focal distance.

The light projector device 3 is also constructed such that a half mirror 34 is provided in the optical path between the stop mechanism 39 and the objective lens 35 so as to confirm through an eyepiece 30 with the naked eye 40 how light is irradiated onto the end face of optical fiber to be measured.

The above-mentioned optical structure is well-known such as for example, a metallographical microscope.

Figure 3:
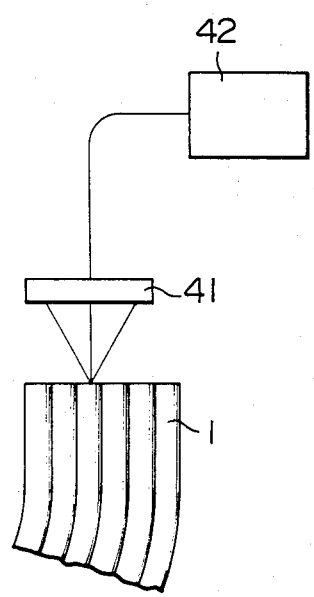
FIG. 3 is a schematic view illustrating a light receiving device used in the inspection apparatus shown in FIG. 1.

Explanation will be made to the construction of the light receiver 4 with reference to FIG. 3. The light receiver 4 includes a photoelectric conversion device 41 and an ammeter 42. Generally, a photodiode and photomultiplier may be used for the photoelectric conversion device 41. However, it may be sufficiently if the light receiving area thereof is larger than the light irradiation area which is determined depending upon the numerical aperture of the optical fiber to be measured and the distance as measured from the light emitting end thereof. Further, desirably, the light receiving surface has as low sensitivity unevenness as possible. Further, it is preferable that measurement is carried out in a dark room in order to prevent stray light from coming into the light receiver from the surrounding area thereof.

The procedure of actually measuring irregularities in optical transmission loss of an optical fiber assembly by using the inspection apparatus of FIG. 1 will hereinunder be descirbed. First of all, the optical fiber assembly 1 to be measured is fixedly mounted on the gripping means 2 so that the distance between both ends of the optical fiber assembly 1 may be equal to the distance between the objective lens and the photoelectric conversion element. For being fixedly mountd on the latter, the former may be so done with the use of adhesive agent. However, mere mechanically fastening means such as bolts and nuts can also be used. Namely, it is sufficient that the optical fibers are so fixed as not to move relative to the gripping means when polished. Next, both ends of the optical fiber assembly are polished, and, then, the gripping means 2 is set onto the first slider block 9. Thereafter, measurements are sequentially performed through manipulating the knobs 8, 14 while checking a light receiving end involved with the naked eye by use of the optical system which uses the half mirror. When carrying out the measurements, it is necessary to stop the irradiation light by means of the field stop mechanism 33 so as to prevent light from being irradiated onto other optical fibers than the single optical fiber to be measured. The measurement data are obtained from the output of the light receiver 4, and their variations are calculated. Thus, the irregularities in optical transmission loss are determined with respect to the optical fiber.

FIG. 4 is a perspective view of the inspection apparatus in a variant form of the preceding embodiment, wherein the light receiving ends and the corresponding light emitting ends of an optical fiber assembly are arrayed in parallel. In this arrangement, two optical fiber assemblies 1 are mounted such that respective ends at each end side 1a, 1b of the optical fibers are gripped between gripping plates 2a, 2b of a gripping means 2. Further, the end faces of the optical fibers at one end side are substantially flush with the end faces thereof at the other end side. In this inspection apparatus, the distance L3 between the light projector 3 and the light receiving end face of the optical fiber assembly, as well as the distance L4 between the light receiver 4 and the light emitting end face of the optical fiber assembly, is at all times kept constant. Further, the distance L1 or L1a between the light receiving end face and the corresponding light emitting end face of the optical fiber assembly is adjusted equally.

As already understood, in the arrangement shown in FIG. 4, an optical fibers arranged in plural rows can be inspected after being mounted to the inspection apparatus in a similar manner as shown in this figure.

Further, in the inspection apparatus shown in FIG. 4, it is necessary that the distance L3 between the light projector 3 and the light receiver 4 is adjustable in accordance with the distance L1 or L1a between the gripped light receiving and emitting ends 1a, 1b of optical fibers in each row to be inspected. Instead of the adjustable distance L2 the inspection apparatus may be so arranged that the distance L1 or L1a between the gripped light receiving and emitting ends of the optical fibers 1 in each row is adjustable.

Figure 5:
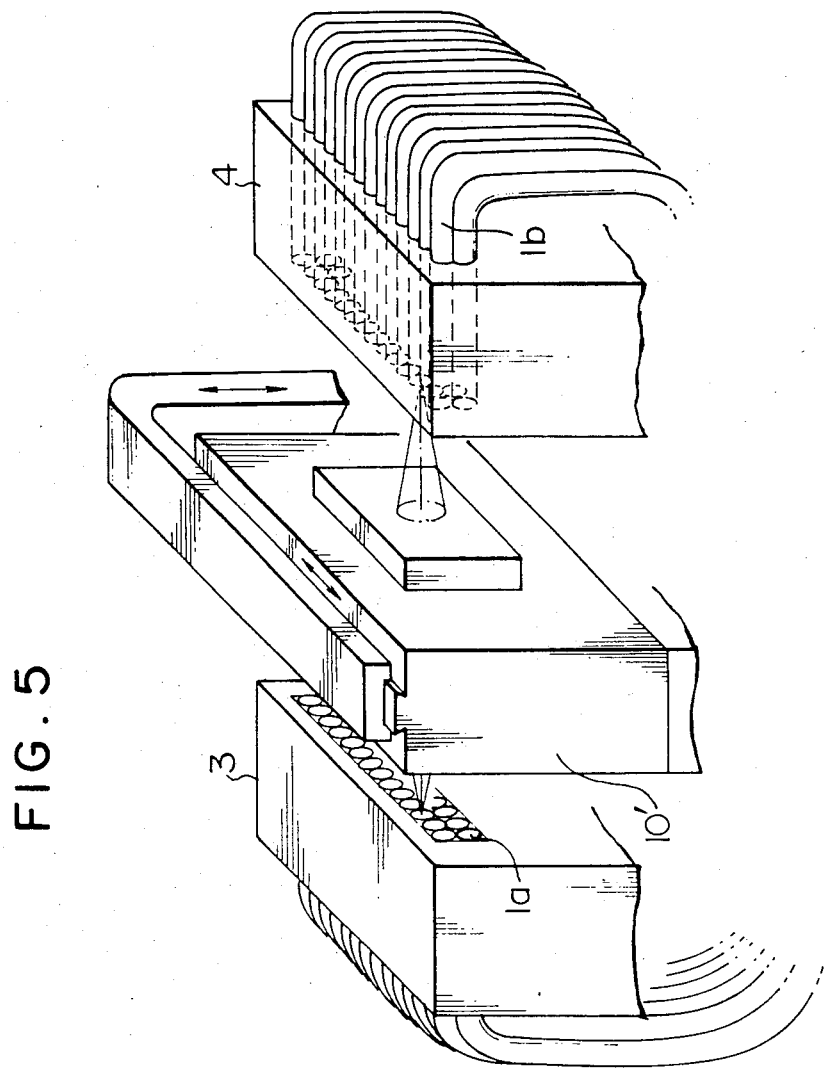
FIG. 5 is a perspective view illustrating an inspection apparatus in a second embodiment for the present invention.

FIG. 5 shows the second embodiment of the present invention in which the optical fiber assembly is looped with both ends thereof being opposed together in the horizontal direction. Further, a plate-like slide member 10' is disposed between both ends of the optical fiber assembly, extending its each main surface in a vertical plane. This slide block 10' is so arranged that it is movable in the vertical and horizontal directions as indicated by the arrows. Further, the slide block carries the light projector 3 and the light receiver 4 which are attached on the opposite main surfaces thereof, respectively, so that the light beam from the projector 3 is directed to the light receiving end of each optical fiber assembly, and is received by the light receiver after passing through the optical fiber.

With this arrangement shown in FIG. 5, an optical fiber assembly in which several optical fibers are arranged in plural rows can be simply inspected by moving the plate-like slide block 10' in the directions indicated by the arrows.

The measurement data which have been outputted through the foregoing measurements may be recorded by a hand-writing. However, they may also be inputted into computer to make easy the arrangement of the data, or to offer a good deal of convenience in rewriting the data into a graphical form.

As stated hereinbefore, a large amount of time has hitherto been spent for inspecting an optical fiber assembly. In the present invention, however, an inspection apparatus has been provided whose gripping section is arranged such that both ends of an optical fiber assembly are respectively gripped in such a relationship that the distance between both ends of each optical fiber being kept equal, and whose optical system controls the irradiation light and permits the irradiation to be checked with the naked eye. Thus, simple and prompt measuring of the irregularities in optical transmission loss of the optical fiber assembly has become possible.

What is claimed is:

1. An apparatus for inspecting an optical fiber assembly composed of a plurality of optical fibers having light receiving and emitting ends, in such a manner as to measure irregularities in transmission loss of said optical fibers, comprising: a base; a first slider block slidably laid on said base; gripping means attached to said first slider block and adapted to grip both ends of said optical fiber assembly in a manner that they are substantially flush with each other; a feed mechanism for feeding said first slider block by sliding the same on said base; a frame member secured to said base; a second block carried by said frame member; a light projector carried by said second slider block, and adapted to irradiate a light beam onto said light receiving end of one of said optical fibers; a light receiver carried by said second slider block and adapted to receive a light beam from said light emitting end of said one of said optical fibers; and a light stop mechanism disposed in said light projector and adapted to stop said light beam irradiated by said light projector, so that said light beam may be irradiated, exclusively, onto said light receiving end of only one of said optical fibers and within the same.

2. An apparatus as set forth in claim 1, wherein said first slider block carries a light shield plate for preventing stray light reaching said light receiver from said light projector.

3. An apparatus as set forth in claim 1, wherein said both ends are gripped in substantially the same plane.

4. An apparatus as set forth in claim 1, wherein said feed mechanism includes a rack and pinion mechanism.

5. An apparatus as set forth in claim 1, wherein said first slider block has a dove-tail rail which is received in a dove-tail groove formed in said base.

6. An aparatus for inspecting an optical fiber assembly composed of a plurality of optical fibers having light receiving and emitting ends, in such a manner as to measure irregularities in transmission loss of said optical fibers, comprising: a base; a first slider block slidably laid on said base; gripping means attached to said first slider block and adapted to grip both ends of said optical fiber assembly; a first feed mechanism for feeding said first slider block by sliding the same on said base; a frame member secured to said base; a second slider block slidably carried by said frame member; a light projector carried by said second slider block and adapted to irradiate a light beam onto said light receiving end of one of said optical fibers; a light receiver carried by said second slider block and adapted to receive a light beam from said light emitting end of said one of said optical fibers; a light stop mechanism disposed in said light projector and adapted to stop the light beam irradiated by said light projector so that said light beam may be irradiated, exclusively, onto said light receiving end of only one of said optical fibers and within the same; and a second feed mechanism for feeding said second slider block by sliding the same along said frame member.

7. An apparatus as set forth in claim 6, wherein said first slider block carries a light shield plate for preventing stray light reaching said light receiver from said light projector.

8. An apparatus as set forth in claim 6, wherein said both ends are gripped in substantially the same plane.

9. An apparatus as set forth in claim 6, wherein said first feed mechanism includes a rack and pinion mechanism.

10. An apparatus as set forth in claim 6, wherein said second feed mechanism includes a screw rod.

11. An apparatus as set forth in claim 6, wherein said first slider block has a dove-tail rail which is received in a dove-tail groove formed in said base.

12. An apparatus as set forth in claim 6, wherein said second slider block is fed in the directions orthogonal to the directions in which said first slider block is fed, by means of said second feed mechanism, and said second slider block has a dove-tail groove into which a dove-tail rail formed on said frame member is fitted.

* * * * *